UNITED STATES PATENT OFFICE.

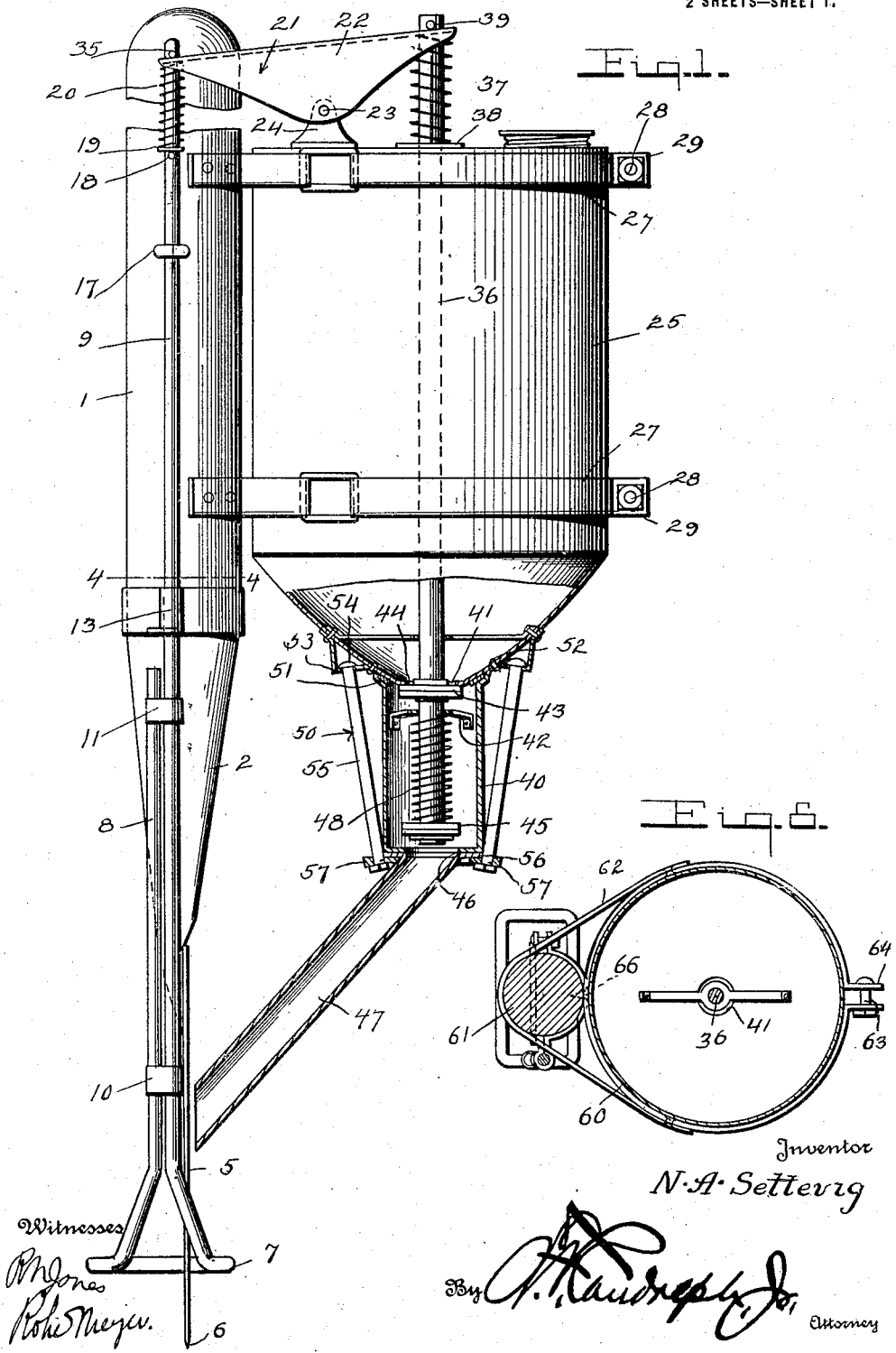

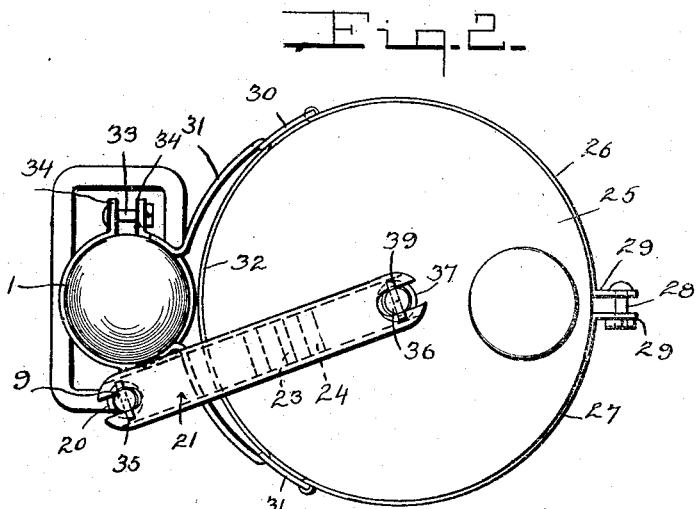

NELS A. SETTEVIG, OF KLOTEN, NORTH DAKOTA.

PLANT-ERADICATOR.

1,205,036.  Specification of Letters Patent.  Patented Nov. 14, 1916.

Application filed November 3, 1915. Serial No. 59,428.

*To all whom it may concern:*

Be it known that I, NELS A. SETTEVIG, a citizen of the United States, residing at Kloten, in the county of Nelson and State of North Dakota, have invented certain new and useful Improvements in Plant-Eradicators; and I do hereby declare the following to be a full, clear, and exact description of the invention, such as will enable others skilled in the art to which it appertains to make and use the same.

This invention relates to a device for eradicating or exterminating various types of weeds, such as dandelions, plantain, or the like, and the primary object of the invention is to provide a weed eradicator or exterminator, which includes means for rupturing the root of the weed or plant, and applying an eradicating liquid to the ruptured portion, for killing the roots of the plants, and thereby eliminating the same.

Another object of this invention is to provide a plant eradicator as specified, which includes a vertically movable plant root splitting blade, the downward splitting movement of which is limited, and to provide means for measuring and dispensing the eradicating or root destroying liquid into the split portion of the root of the weed or plant immediately after the splitting blade has been withdrawn.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of the improved plant eradicator, showing parts broken away and certain of the mechanisms in section, Fig. 2 is a plan view of the plant eradicator, Fig. 3 is a perspective view of the root splitting blade and its guard, Fig. 4 is a cross sectional view on the line 4—4 of Fig. 1, Fig. 5 is a detail sectional view of the liquid controlling valve structure, and Fig. 6 is a horizontal section of a modified form of the plant eradicator.

Referring more particularly to the drawings, 1 designates the handle of the device, which is preferably circular shaped in cross section, and which has its lower end 2 reduced, and tapering inwardly as it extends downwardly, as is clearly shown in Fig. 2 of the drawings. The extreme lower end of the reduced end 2 of the handle 1, has a downwardly extending shoulder 3 formed thereupon, to which is detachably connected the plant root splitting blade 5. The blade 5 is constructed of flat metal and is similar in shape to an ordinary chisel blade, having its lower edge beveled, as is shown at 6 for forming a splitting or cutting edge.

The blade 5 travels through a supporting guard 7, which is constructed of wire or a metallic rod, being substantially rectangular shaped in plan, and having its end bent upwardly and extending vertically in a parallel line with each other, forming the vertical rods 8 and 9 which are bound together or connected by metallic straps 10 and 11. The upstanding rod 8 terminates a considerable distance below the termination of the rod 9, and it co-acts with an outstanding projection 12 formed upon a collar 13 for limiting the inserting movement of the blade. The collar 13 slidably supports the vertical rod 9, and it is in turn connected to the handle 1 by a metallic strap 14, which extends around the handle and is bound thereon by the tightening of a bolt 15 which passes through tangentially extending flanges 16 formed upon the strap 14. The rod 9 is also slidably supported by an eye-bolt or collar 17 which is carried by the handle 1 above and in alinement with the collar 13. A pin 18 extends diametrically through the vertical rod 9 and has a collar 19 resting upon its upper surface. A spiral spring 20 is coiled about the rod 9 and has its lower end resting upon the upper surface of the collar 19. The upper end of the spiral spring 20 engages the under surface of a pivotally mounted lever 21. The lever 21 has downwardly extending transversely disposed sides 22 which are pivotally mounted upon a pin 23. The pin 23 is carried by upstanding brackets 24, which are mounted upon the upper surface of the eradicating liquid retaining receptacle or tank 25.

The receptacle or tank 25 is supported by metallic straps 26 and 27, which extend partially about the receptacle 25 and are held in binding engagement with the same by the adjustment of bolts 28, which extend through tangentially extending flanges 29 formed upon the ends of the bands 26 and 27. The bands 26 and 27 have their ends remote from the ends upon which the tangentially extending flanges 29 are formed, connected to links 30 and 31, which links are in turn connected to a metallic band 31, which passes through the links, about the handle 1, and also has a portion 32 which lies flat against a portion of the surface of the tank. The metallic bands 31 are securely clamped upon the handle 1 by bolts 33 which extend through flanges 34 formed upon the bands.

A pin 35 extends diametrically through the upper end of the rod 9 above the upper surface of the lever 21, for limiting the upward movement of the lever independent of movement of the rod.

The end of the lever 21, opposite to the one which is connected to the rod 9, is connected to a valve stem 36, which extends centrally through the receptacle or tank 25. A spiral spring 37 is coiled about the upper end of the valve stem 36, and its lower end engages the upper surface of a collar 38 which rests against the upper surface of the receptacle 25. The upper end of the spring 37 engages the under surface of the lever 21. A pin 39, extends diametrically through the upper end of the valve stem 36 above the upper surface of the lever 21 for limiting the upward movement of the lever independent of the valve stem. The receptacle or tank 25 has a depending projection 40 formed upon its lower end, which communicates with the interior of the receptacle, through an opening 41 formed in the base of the receptacle. The base of the receptacle 25, is substantially semi-spherical in shape, as is clearly shown in Fig. 1 of the drawings, and the opening 41 is formed in the center of the semi-spherical portion of the base. A spider 42 is loosely mounted within the measuring projection 40 and extends horizontally across the projection 40, directly beneath the opening 41 and forms means for preventing sidewise movement of the valve stem 36. The disk 43 is carried by the valve stem 36, upwardly of the lower terminal of the same, and it has a gasket 44 mounted upon its upper end for engagement with the under surface of the bottom of the receptacle, surrounding the opening 41, for cutting off the flow of the eradicating liquid into the measuring projection 40, while the root of the plant is being split. The valve stem 36 has a second valve disk 45 mounted thereon adjacent its lower end, which valve disk is provided for regulating the flow of eradicating liquid out of the measuring compartment 40, through the opening 46, and the spout 47, which leads downwardly from the projection 40 to the blade 5. A spiral spring 48 is coiled about the valve stem 36, intermediate of the valve disks 43 and 45.

Any suitable structure, such as is illustrated at 50 may be employed for connecting the spout 47 to the tank or receptacle 25, and for connecting the projection 40 to the tank. A gasket or packing washer 51 is preferably inserted between the flared upper end of the projection or measuring compartment 40 and the under surface of the tank or receptacle 25, for preventing the leakage of the eradicating liquid. In Fig. 1 of the drawings, the upper end of the compartment 40 is shown as flared outwardly and secured to the bottom of the receptacle 25 by means of rivets or the like, as is shown at 52. The upper end of the compartment 40 then extends outwardly tangentially from the curvature of the bottom of the receptacle 25 and forms substantially horizontally positioned shoulders 53, which support the head 54 of stay bolts 55. The stay bolts 55 extend downwardly through the flange 56 formed upon the upper end of the spout 47, for holding the spout securely connected to the receptacle 25 and against the bottom of the compartment 40. The bolts 55 have clamping plates 57 mounted thereon, which engage the under surface of the flange 56 and bind it in firm engagement with the under surface of the measuring compartment 40.

In Fig. 6 of the drawings, a modified form of the plant eradicator is illustrated, which shows a modified construction for connecting the tank 60 to the handle 61, which tank and handle correspond to the tank 25 and the handle 1 respectively. In this figure, a metallic band 62 is provided, which extends about the handle 1, and tangentially therefrom, to the sides of the tank 60, extending about substantially one-half the circumference of the tank, and being bound thereon by a bolt 63 which extends through flanges 64 formed on the ends of the straps 62. The tank 60 is further connected to the handle 61 by nails, or any suitable type of analogous fastening means 66, which extend through the tank and into the handle.

In the operation of the improved plant or weed eradicator: The base 7 is placed upon the ground, directly above the heart of the plant or weed, and the handle 1 is forced downwardly, which forces the blade 5 downwardly through the root of the plant, splitting the same. When the handle 1 is forced downwardly, the projection 12 will engage the upper end of the vertical rod 8, and eliminate the downward movement of the blade. The rod 9 will remain stationary, during the downward movement of the handle 1, owing to the fact that it is formed upon the base 7, which rests upon the upper surface of the ground, and it will thus rock the lever 21, moving the valve stem 36 vertically, for unseating the valve disk 43, and seating the valve disk 45, thereby permitting the eradicating liquid to flow from the tank or receptacle 25 into the measuring compartment 40, during the splitting of the root of the plant. When the blade 5 is withdrawn, by upward movement of the handle 1, it will move the valve stem 36, for seating the valve 43, and unseating the valve disk 45, thereby cutting off the flow of the eradicating liquid from the receptacle 25 into the compartment 40, and permitting of the flow of the liquid from the compartment 40 into and through the spout 47, from which it is forced against the surface of the blade 5, which guides the liquid into the ruptured or split portion of the root of the plant, efficiently killing the same, and thereby eradicating the plant or weed.

In the practical use of the plant eradicator, it has been found that one of the most economical eradicating liquids, is ordinary gasolene, but any suitable type of eradicating liquid may be employed without departing from the spirit of this invention.

From the foregoing description taken in connection with the accompanying drawings the advantages of construction and of the method of operation of the improved plant eradicator will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a plant eradicator, the combination of a handle, a plant root splitting blade carried by said handle, a supporting base for engagement with the surface of the ground and arranged around said blade, upwardly extending angular extensions formed on said supporting base and slidably mounted on said handle, an eradicating liquid retaining tank carried by said handle, a valve mechanism carried by said tank and a lever pivotally secured intermediate its ends to the top of said tank, one end of the lever engaging said valve mechanism and the other end engaging said upstanding extension on said base whereby said valve mechanism is operated when said blade is forced into the ground and said supporting base engages the ground.

2. In a plant eradicator, the combination of a handle, a plant root splitting blade carried by said handle, a supporting base for engagement with the surface of the ground and arranged around said blade, upwardly extending angular extensions formed on said supporting base and slidably mounted on said handle, an eradicating liquid containing tank carried by said handle, a compartment secured to the lower portion of said tank, said tank having an opening communicating with said compartment, a valve stem slidably mounted in said tank and extending into said compartment, a valve carried by said valve stem adapted to seat in said opening in said tank, a similar valve secured to the lower portion of said valve stem and adapted to close the outlet in said compartment, means to normally hold said valve seated in said opening in said tank, and to hold the other valve unseated, and a lever pivotally secured intermediate its ends to the top of said tank, one end of said lever engaging the upper terminal of said valve stem and the other end engaging said upstanding extension on said base so that said valve seated in the opening in said tank is unseated and the valve in said outlet of the compartment is seated when said blade is forced into the ground and said supporting bar engages the ground.

In testimony whereof I affix my signature in presence of two witnesses.

NELS A. SETTEVIG.

Witnesses:
LUDWIG J. SEIBEL,
JAS. J. EARLEY.

Copies of this patent may be obtained for five cents each, by addressing the "Commissioner of Patents, Washington, D. C."